June 1, 1948. G. E. DUNN 2,442,640
METHOD OF INSTALLING BOOTS ON UNIVERSAL JOINTS
Filed Aug. 20, 1947
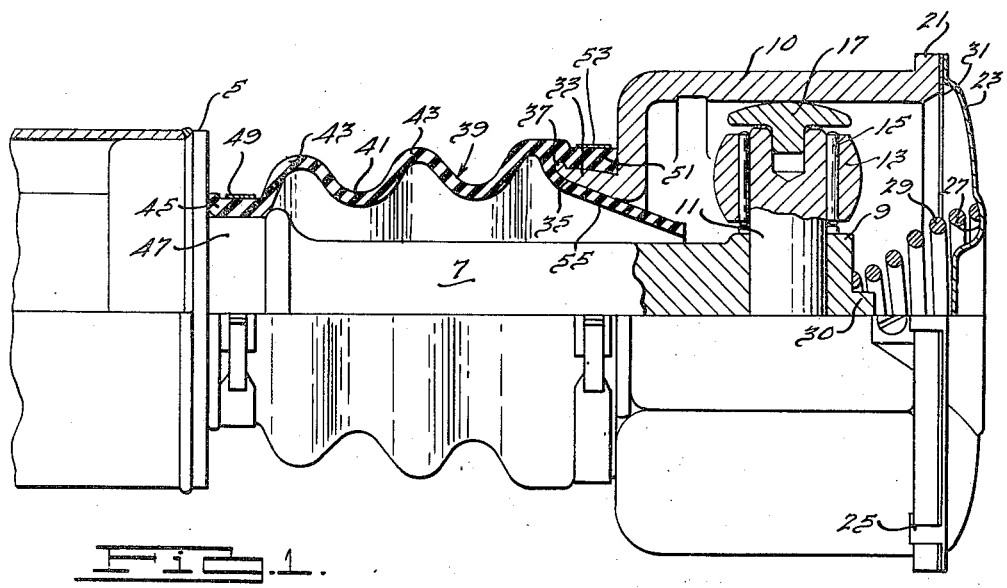
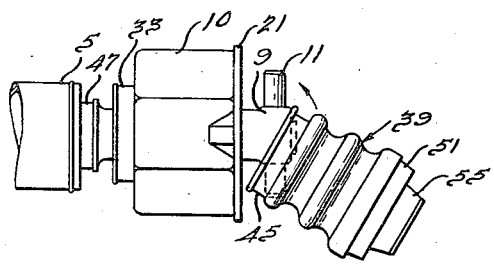
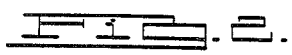
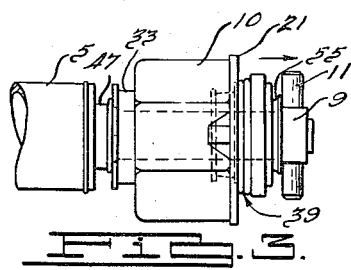
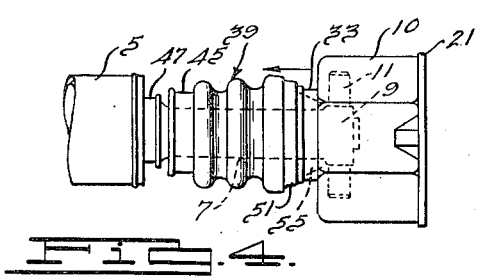
INVENTOR.
George E. Dunn.
BY
Harness, Dickey & Pierce.
ATTORNEYS.

Patented June 1, 1948

2,442,640

UNITED STATES PATENT OFFICE 2,442,640

METHOD OF INSTALLING BOOTS ON UNIVERSAL JOINTS

George E. Dunn, Dearborn, Mich., assignor to Universal Products Company, Incorporated, Detroit, Mich., a corporation of Delaware Application August 20, 1947, Serial No. 769,579

1 Claim. (Cl. 29—148)

This invention relates to an improved method of installing boots on universal joints.

More particularly, this invention relates to a method of installing a resilient boot of the character disclosed in Patent No. 2,308,073, issued to Joseph W. Hagerty on January 12, 1943, on a universal joint of the character disclosed in Patent No. 1,987,678, issued to Paul B. Goodard and Frank Ketcham on January 15, 1935, in which the joint is of the type including a housing provided at opposite sides with cylindrical guides and a central guide of a cylindrical character. This housing is adapted to be connected to a flanged shaft or the like at one end. A second shaft member projects into the housing and into the cylindrical central guide thereof. The shaft is provided with a pin extending perpendicularly therethrough, on the opposite ends of which are journaled truncated balls. The ends of the pin are each provided with an axial bore for receiving the shank of a button which bears radially against the housing for centering the joint.

A resilient boot of the type shown in Hagerty Patent No. 2,308,073 encloses the shaft outwardly of the housing so as to seal lubricant therein. It has heretofore been the practice, if for any reason it was necessary to replace the boot after the joint has been installed in a vehicle or the like, to use as a replacement for the resilient boot, a split leather boot which is laced in place, or a like integral resilient boot which is installed by driving the pin from the shaft and removing the housing to permit the installation of the new boot. As the pin must be accurately centered, with respect to the shaft and housing in order for the joint to operate properly, difficulty has been encountered when garage mechanics disassemble the pin from the shaft and then reinsert the same. Most mechanics have no accurate way of properly centering the pin within the shaft so that there is a probability of it being improperly reassembled, whereby the joint will not function properly.

It is therefore the principal object of this invention to provide a method whereby an integral resilient boot may be installed on a universal joint in a simple, effective, and relatively speedy manner without disassembling the pin from the shaft.

Other objects of this invention will become apparent from the following detailed description taken in conjunction with the accompanying drawing in which:

Figure 1 is a longitudinal sectional view of an assembled universal joint;

Fig. 2 is a reduced side elevational view of the universal joint illustrating the position of the parts thereof in the first step of installing a new boot on the joint in accordance with this invention;

Fig. 3 is a view similar to Fig. 2 illustrating the position of the parts in second step of the installation of the boot; and Fig. 4 is a view similar to Fig. 2 illustrating the boot in its completely assembled position.

Referring now to the drawing, it will be seen that a tubular propeller shaft 5 is shown as provided at one end with a universal joint which comprises generally a shaft 7 having a head 9 disposed within the central cylindrical guide of a housing 10. The head 9 is provided with a bore disposed perpendicularly to the axis of the shaft 7 for receiving a transversely disposed pin 11. The opposite ends of the pin 11 project equal distances on opposite sides of the head 9, thus providing trunnions upon which are journaled truncated balls 13 by means of needle bearings 15. The opposite ends of the pin are each provided with an axial bore for receiving the shanks of end thrust members or buttons 17 which are disposed in cylindrical guides on opposite sides of the housing, and which bear radially against the housing 10 for centering the joint.

The shaft 7 extends into one end of the housing 10, and the opposite end of the latter terminates in a radially extending annular flange 21 which is adapted to be secured to a complemental flange of a shaft (not shown). A cover plate 23, which is provided with a plurality of radially extending tabs 25, is secured to the flanged end of the housing 10 by bending the tabs over the flange 21. The cover plate 23 is provided with a concentrically disposed annular groove or seat 27 which receives and holds in position the large end of a helical spiral spring 29, the other end of which surroundingly engages a boss 30 concentrically formed on the axially terminating head 9. A suitable gasket 31 is interposed between the cover plate 23 and the housing flange 21 for sealing lubricant within the housing and excluding dirt and dust therefrom. The opposite end of the housing 10 is formed with an annular inwardly disposed flange or rim 33, the inner surface of which is flared outwardly at 35 to provide generally a conical shaped opening for the end of the housing, with the opening flared outwardly into larger diameter. A bead 37 is formed on the outer end of the rim and provides an abutment for assisting in the retention of a part of a boot, generally indicated at 39.

The boot 39 is provided for preventing the escape of lubricant and also preventing the ingress of dirt, water, or other foreign matter, and is made of a material comprising rubber or rubber-like material which is flexible. Elastic and flexible natural rubber or synthetic rubber may be employed and in the case of synthetic rubber, Neoprene or Perbunan may be used. The boot 39 comprises an outer bellows portion 41 having a plurality of spaced corrugations 43. As seen in Fig. 1, the left end of the boot terminates in a noncorrugated normally tapered portion 45 adapted to encircle a cylindrical portion 47 of the shaft 7. A clamp 49 is provided to retain the end of the boot on the cylindrical shaft portion 47. The opposite end of the boot has a rim or flange 51 adapted to extend over the rim 33 of the housing 10, and when so positioned is secured to the rim 33 by a clamp 53. A frusto-conical boot portion 55 extends from a point adjacent the inner end of the boot rim 51 and this portion is adapted to extend along the surface 35 of the housing rim 33 so as to prevent leakage of lubricant from the housing.

It will be appreciated that when the joint is initially assembled, the boot 39 is secured either to the cylindrical portion 47 of the shaft 7 or to the rim 33 of the housing 10, and then inserted over and clamped to the other member. However, after the joint has been assembled in, for example, an automobile, the practice heretofore, if a rubber boot is to be installed, has been to cut away the old boot and push the housing 10, as viewed in Fig. 1, to the left, and then disassemble the button 17, truncated balls and bearings 13 and 15, and drive the pin 11 out of the head portion 9 so that the housing can be withdrawn to the right. A new rubber boot 39 was then installed on either the shaft 7 or housing rim 33 and the housing and its parts reassembled. This has proved unsatisfactory as this work is generally done by an ordinary garage mechanic who does not possess the proper instruments to properly center the pin 11 within the shaft, so that the pin 11 may be improperly centered and the joint will not operate properly.

It is therefore desirable to provide a method of installing the boot 39 on the joint without necessitating removal or movement of the pin 11. The applicant has devised a method of so installing the boot. The installation is accomplished by first removing the cover plate 23 and the spring 29, after the old boot has been cut away, and then sliding the housing 10 to the left as viewed in Fig. 1 so that the buttons 17 and the balls 13 and the bearings 15 can be removed from the pin 11. The inside of the housing 10, the shaft head portion 9, and both the inside and outside of the new or replacement boot 39 are then thoroughly greased with preferably a light grease. The rim 45 on one end of the boot is then stretched over the pin 11 as can be seen in Fig. 2. This is best accomplished by tilting the boot at an angle, so that one end of the pin 11 is disposed within the end of the boot, and then stretching the rest of the boot end over the opposite end of the pin. The remainder of the boot is then worked inwardly over the pin by a pushing and rotating movement with the fingers and thumbs, until it is in the position illustrated in Fig. 3, wherein the boot is compressed between the pin 11 and the housing 10 with the conical portion 55 on the outer end of the boot abutting the pin 11 and the rim 45 on the inner end of the boot within the housing 10.

With the housing in position so the pin 11 can enter the cylindrical guides, the housing is grasped and pulled to the right, as viewed in Fig. 3, over the pin 11. When this occurs, the inner end of the greased boot will be forced through the housing and through the opening defined by the housing rim 33. That is, the boot rim 45 will be forced through the housing opening so that it can then be grasped by the fingers and thumbs and the boot pulled completely through the housing opening (Fig. 3) so that the rim 45 can be connected to the cylindrical shaft portion 47. The frusto-conical portion 55 on the opposite end of the boot can then be properly positioned so as to extend along the tapered portion 35 of the rim 33, and the boot rim 51 can be positioned over the housing rim 33, as seen in Fig. 1. The replacement boot has thus been installed without removal of the pin 11. The truncated balls 13, the bearings 15, and buttons 17 will then be replaced, and the joint filled with lubricant before the cover plate 23 and spring 29 are reassembled. The lubricant will then be completely sealed in the joint.

It will thus be seen that a method of installing a universal-joint boot is provided which makes the installation of the boots relatively simple and which prevents any damage to the universal joint or any change in the trunnions.

I claim:

The method of installing an annular, one-piece rubber boot on a universal joint of the type including a housing having opposed cylindrical guideways and a shaft projecting axially into one end of said housing with trunnions projecting radially from opposite sides of the shaft for supporting truncated balls on the opposite ends thereof which roll in said opposed guideways, comprising the steps of moving the housing axially along said shaft so that said trunnions are disposed outwardly of the other end of said housing, of removing said truncated balls, of greasing the trunnions, the shaft, and the boot to be installed both inside and out, of positioning said boot angularly with respect to said shaft so that one of said trunnions is received in one end of said boot, of stretching said one end of the boot over the other trunnion, of working the boot inwardly until it is disposed between the housing and the trunnions, of pulling the housing axially toward said trunnions so as to force the inner or advancing end of said boot out of said one end of the housing and around the shaft, and of pulling the entire boot out of the housing and securing said advancing end to the shaft and the opposite end to said housing.

GEORGE E. DUNN.

REFERENCES CITED

The following references are of record in the file of this patent:

UNITED STATES PATENTS

| Number | Name | Date |
| --- | --- | --- |
| 1,987,678 | Goodard | Jan. 15, 1935 |
| 2,308,073 | Hagerty | Jan. 12, 1943 |